(12) United States Patent
Vij et al.

(10) Patent No.: US 10,977,255 B2
(45) Date of Patent: Apr. 13, 2021

(54) ANALYTICS PLATFORM USING TELEMATICS DATA

(71) Applicant: Accenture Global Solutions Limited, Dublin (IE)

(72) Inventors: Abhinav Vij, Gurgaon (IN); Anand Premsundar, Chennai (IN); Werner Rapberger, Zürich (CH); Chinmay Jha, Gurgaon (IN); Purvika Bazari, Kota (IN); Aditi Bansal, Lucknow (IN)

(73) Assignee: Accenture Global Solutions Limited, Dublin (IE)

( * ) Notice: Subject to any disclaimer, the term of this patent is extended or adjusted under 35 U.S.C. 154(b) by 1213 days.

(21) Appl. No.: 15/241,586

(22) Filed: Aug. 19, 2016

(65) Prior Publication Data
US 2017/0140293 A1    May 18, 2017

(30) Foreign Application Priority Data
Nov. 13, 2015 (IN) ............................ 6105/CHE/2015

(51) Int. Cl.
*G06F 16/2457* (2019.01)
*G06Q 40/08* (2012.01)
(Continued)

(52) U.S. Cl.
CPC ........ *G06F 16/24578* (2019.01); *G06F 16/29* (2019.01); *G06N 20/00* (2019.01); *G06Q 40/08* (2013.01)

(58) Field of Classification Search
CPC ................. G06F 16/2457; G06F 16/29; G06F 16/24578; G06N 20/00; G06N 20/10; G06N 20/20; G06Q 40/08
(Continued)

(56) References Cited

U.S. PATENT DOCUMENTS

| | | | | |
|---|---|---|---|---|
| 10,163,275 | B1 * | 12/2018 | Brinkmann | G01S 19/01 |
| 2007/0282638 | A1 * | 12/2007 | Surovy | G06Q 40/02 |
| | | | | 705/4 |

(Continued)

OTHER PUBLICATIONS

Haendel et al., "Insurance telematics: opportunities and challenges with the smartphone solution," https://www.kth.se/social/upload/5329ea4bf276541e4732ddd6/insurance_telematics_KTHFP.pdf, Jul. 24, 2014, 12 pages.

(Continued)

*Primary Examiner* — Shane D Woolwine

(74) *Attorney, Agent, or Firm* — Harrity & Harrity, LLP

(57) ABSTRACT

A device may determine a set of trip attributes, associated with a driving trip, based on at least two of: location data associated with the driving trip, geospatial data associated with the driving trip, or weather data associated with the driving trip. The device may derive a set of driving style variables, associated with a manner in which the vehicle is driven during the driving trip, based on at least two of: the location data, the geospatial data, the weather data, acceleration data associated with the driving trip, or a location-based variable derived from the location data. The device may generate a trip risk score, associated with the driving trip and based on the set of trip attributes and the set of driving style variables, that includes a metric indicating a level of risk associated with the driving trip. The device may provide information associated with the trip risk score.

20 Claims, 11 Drawing Sheets

(51) Int. Cl.
*G06N 20/00* (2019.01)
*G06F 16/29* (2019.01)

(58) Field of Classification Search
USPC ..................................................... 706/47, 52
See application file for complete search history.

(56) References Cited

U.S. PATENT DOCUMENTS

| 2012/0123806 A1* | 5/2012 | Schumann, Jr. ............................ G08G 1/096775 705/4 |
| 2013/0046562 A1* | 2/2013 | Taylor ................... G06Q 40/00 705/4 |
| 2016/0171621 A1* | 6/2016 | Bogovich .......... G01C 21/3415 705/4 |

OTHER PUBLICATIONS

Yin et al., "Mining GPS Data for Trajectory Recommendation," https://faculty.ist.psu.edu/jessieli/Publications/PAKDD14-PYin.pdf, May 2014, 12 pages.

Nie et al., "Driving Behavior Improvement and Driver Recognition Based on Real-Time Driving Information," http://cs229.stanford.edu/proj2013/NieWuYu_Driving%20Behavior%20Improvement%20and%20Driver%20Recognition%20Based%20on%20Real-Time%20Driving%20Information.pdf, Dec. 13, 2013, 5 pages.

Wang et al., "STING : A Statistical Information Grid Approach to Spatial Data Mining," http://www.vldb.org/conf/1997/P186.PDF, 1997, 10 pages.

Sathyanarayana et al., "Driver Behavior Analysis and Route Recognition by Hidden Markov Models," Proceedings of the 2008 IEEE International Conference on Vehicular Electronics and Safety, Sep. 22-24, 2008, 6 pages.

Quintero et al., "Intelligent Erratic Driving Diagnosis based on Artificial Neural Networks," IEEE Oct. 2010, 6 pages.

Ericsson, "Independent Driving Pattern Factors and their Influence on Fuel Use and Exhaust Emission Factors," Transportation Research Part D6, 2001, 21 pages.

Arthur, Jr. et al., "The Five-Factor Model, Conscientiousness, and Driving Accident Involvement," Journal of Personality 64:3, Sep. 1996, 27 pages.

Wang et al., "Review of Driving Conditions Prediction and Driving Style Recognition Based Control Algorithms for Hybrid Electric Vehicles," IEEE, 2011, 7 pages.

* cited by examiner

Speed

| Segment Score | Description |
|---|---|
| 1 | Low Speed trips with very less/zero variation in speed than the normal |
| 2 | Low to Medium Speed trips with less variation in speed than the normal |
| 3 | Medium to High Speed trips with higher variation in speed than normal |
| 4 | High Speed trips with extreme variation in speed than normal |
| 5 | High Speed trips with extreme variation in speed than normal in the total miles as well as for the overall trip |

Segment Score values: 10, 7, 5, 3, 1

Trip Attributes

| Segment Score | Description |
|---|---|
| 1 | Short Distance trips under Normal Weather |
| 2 | Long distance trips under Normal Weather |
| 3 | Long Distance trips in High Speed Regions |
| 4 | Trips under Moderate/Extreme Weather |
| 5 | Trips during Night |
| 6 | Short distance trips with high number of turns, mostly in evening |
| 7 | Long distance trips during evening time |

Segment Score values: 10, 9, 7, 5, 4, 3, 2

FIG. 5A

| Acceleration | | |
|---|---|---|
| Comfort Score | | Description |
| 1 | | Low acceleration within benchmarks |
| 2 | | Low acceleration within benchmarks with sudden changes in acceleration |
| 3 | | Low acceleration higher than the benchmark in different weather conditions |
| 4 | | High acceleration, higher than the benchmark |
| 5 | | Sudden changes in acceleration higher than the benchmark |
| 6 | | High acceleration/deceleration, higher than the benchmark |
| 7 | | Very High Propensity to accelerate on bumps/breakers than the benchmark |
| 8 | | Acceleration higher than the benchmark, sudden changes in acceleration in the start of the journey |
| 9 | | High acceleration, higher than the benchmark. Extreme jerks observed throughout the journey |

| Direction | | |
|---|---|---|
| Comfort Score | | Description |
| 1 | 10 | Speed within thresholds at sharp turns |
| 2 | 9 | High acceleration than the average benchmark at turns |
| 3 | 5 | High propensity to change lanes and take turns |
| 4 | 3 | Very High propensity to change lanes and accelerate at turns |
| 5 | 2 | Extreme High propensity to cross speed and acceleration thresholds at sharp turns |
| 6 | 1 | Extreme propensity to make right turns with very high acceleration |
| 7 | 1 | Extreme propensity to make left turns with very high acceleration |

FIG. 5B

| 10 | Trip Riskiness Score | | | | | | | | | |
|---|---|---|---|---|---|---|---|---|---|---|
| | Trip Attributes | | | | | | | | | |
| Speed | Speed | 10 | 9 | 8 | 7 | 6 | 5 | 4 | 3 | 2 | 1 |
| Riskiness Score | | Short Distance trips under Normal Weather | Long distance trips under Normal Weather | | Long Distance trips in High Speed Regions | | Trips under Moderate/Extreme Weather | Trips during Night | Short distance trips with high number of turns, mostly in evening | Long distance trips during evening time | Long distance trips during night under Moderate/Extreme Weather |
| 10 | Low Speed trips with very less/zero variation in speed than the normal | 10 | 9.1 | | 8.4 | | 8.5 | 8.2 | 7.9 | 7.8 | 7.3 |
| 7 | Low to Medium Speed trips with less variation in speed than the normal | 7.9 | 7.6 | | 7 | | 6.4 | 6.1 | 5.8 | 5.5 | 5.2 |
| 5 | Medium to High Speed trips with higher variation in speed than normal | 6.5 | 6.2 | | 5.6 | | 5 | 4.7 | 4.4 | 4.1 | 3.8 |
| 3 | High Speed trips with extreme variation in speed than normal | 5.1 | 4.8 | | 4.2 | | 3.6 | 3.3 | 3 | 2.7 | 2.4 |
| 1 | High Speed trips with extreme variation in speed than normal in the initial miles as well as for the overall trip | 3.7 | 3.4 | | 2.8 | | 2.2 | 1.9 | 1.6 | 1.3 | 1 |

| Trip Riskiness Score | | 10 | 9 | 7 | 5 | 4 | 3 | 2 | 1 |
|---|---|---|---|---|---|---|---|---|---|
| Direction Riskiness Score | Trip Attributes / Direction | Short Distance trips under Normal Weather | Long distance trips under Normal Weather | Long Distance trips in High Speed Regions | Trips under Moderate/Extreme Weather | Trips during Night | Short distance trips with high number of turns, mostly in evening | Long distance trips during evening time | Long distance trips during night under Moderate/Extreme Weather |
| 10 | Speed within thresholds at sharp turns | 10 | 8.7 | 8.1 | 8.5 | 8.1 | 7.9 | 7.6 | 7.3 |
| 7 | High acceleration than the average benchmark at turns | 7.9 | 7.6 | 7 | 6.4 | 6.1 | 5.8 | 5.5 | 5.2 |
| 5 | High propensity to change lanes and take turns | 6.5 | 6.2 | 5.6 | 5 | 4.7 | 4.4 | 4.1 | 3.8 |
| 3 | Very High propensity to change lanes and accelerate at turns | 5.1 | 4.8 | 4.2 | 3.6 | 3.3 | 3 | 2.7 | 2.4 |
| 2 | Extreme High propensity to cross speed and acceleration thresholds at sharp turns | 4.4 | 4.1 | 3.5 | 2.9 | 2.6 | 2.3 | 2 | 1.7 |
| 1 | Extreme propensity to make right turns with very high acceleration. | 1.7 | 1.4 | 2.8 | 2.2 | 1.9 | 1.6 | 1.3 | 1 |
| 1 | Extreme propensity to make left turns with very high acceleration. | 1.7 | 1.4 | 2.8 | 2.2 | 1.9 | 1.6 | 1.3 | 1 |

FIG. 6C

ANALYTICS PLATFORM USING TELEMATICS DATA

RELATED APPLICATION

This application claims priority under 35 U.S.C. § 119 to Indian Patent Application No. 6105/CHE/2015, filed on Nov. 13, 2015, the content of which is incorporated by reference herein in its entirety.

BACKGROUND

Telematics technology, when applied to a vehicle, may involve the obtaining, sending, and/or receiving of telematics data related to the vehicle and/or a driver of the vehicle. Such telematics data may include location data, speed data, accelerometer data, or the like.

SUMMARY

According to some possible implementations, a method may include: determining, by a device, a set of trip attributes associated with a driving trip of a vehicle, where the set of trip attributes may be determined based on at least two of: location data associated with the driving trip, geospatial data determined based on the location data associated with the driving trip, or weather data associated with the driving trip; deriving, by the device, a set of driving style variables associated with a manner in which the vehicle is driven during the driving trip, where the set of driving style variables may be determined based on at least two of: the location data, the geospatial data, the weather data, acceleration data associated with the driving trip, or a location-based variable derived from the location data; generating, by the device, a trip risk score, associated with the driving trip, based on the set of trip attributes and the set of driving style variables, where the trip risk score may include a metric that indicates a level of risk associated with the driving trip; and providing, by the device, information associated with the trip risk score.

According to some possible implementations, a method may include determining, by a device, a set of trip risk scores, corresponding to a driver, for a set of driving trips, where a trip risk score, of the set of trip risk scores, may include a first metric that indicates a level of risk associated with a corresponding driving trip of the set of driving trip; deriving, by the device, a set of driver variables, associated with the driver, that includes a set of variables associated with a manner in which a vehicle is driven by the driver during the set of driving trips, where the set of driver variables may be derived based on at least two of: driver data associated with the driver, the set of trip risk scores, location data associated with the set of driving trips, geospatial data determined based on the location data associated with the set of driving trips, acceleration data associated with the set of driving trips, or weather data associated with the set of driving trips; generating, by the device, a driver risk score, associated with the driver, based on the set of driver variables, where the driver risk score may include a second metric that indicates a level of risk associated with the driver; and providing, by the device, information associated with the driver risk score.

According to some possible implementations, a non-transitory computer-readable medium may store that, when executed by one or more processors, cause the one or more processors to: determine at least one of: trip attributes based on location data associated with a driving trip of a vehicle, geospatial data associated with the driving trip, or weather data associated with the driving trip; derive driving style variables, associated with a manner in which the vehicle is driven during the driving trip, based on at least one of: the location data, the geospatial data, the weather data, acceleration data associated with the driving trip, or location-based variables derived from the location data; generate a trip risk score, associated with the driving trip, based on the trip attributes and the driving style variables, where the trip risk score may include a metric that indicates a level of risk associated with the driving trip; and provide information associated with the trip risk score.

BRIEF DESCRIPTION OF THE DRAWINGS

FIGS. 5A and 5B show example groups of categories associated with generating a basic trip risk score;

FIGS. 6A-6C are example diagrams associated with generating a basic trip risk based on a speed score, an acceleration score, a direction score, and/or a trip score.

DETAILED DESCRIPTION

The following detailed description of example implementations refers to the accompanying drawings. The same reference numbers in different drawings may identify the same or similar elements.

Telematics data (e.g., location data, speed data, or accelerometer data) may be associated with a vehicle and/or a driver of the vehicle. For example, telematics data may be provided by a device associated with the vehicle (e.g., an accelerometer, a speed sensor, a proximity sensor, a gyroscope, a mobile phone, a global positioning system (GPS) system, etc.) when the vehicle is driven by the driver (i.e., during a driving trip associated with the vehicle).

In some cases, telematics data may be used to assess a driving risk associated with the vehicle and/or the driver (e.g., for insurance purposes). Such a risk assessment, however, may not account for one or more other factors that may impact driving behavior of the driver. These other factors may include weather conditions, geographical areas, road types, road features, or the like. Furthermore, such a risk assessment may not assess the driving risk in the context of a vehicle trip. For example, the risk assessment may not assess the driving risk on a trip-by-trip basis.

Implementations described herein may provide an analytics platform capable of generating a trip risk score, associated with a driving trip of a vehicle, and/or a driver score associated with a driver of the vehicle (e.g., based on a set of trip risk scores). The analytics platform may use data provided by multiple telematics data sources (e.g., an accelerometer, a GPS, or the like) as well as one or more additional data sources. These additional data sources may provide geospatial data (e.g., geographic information systems (GIS) data), weather data, or the like.

In this way, an analytics platform may generate a driver risk score that more accurately assesses the driving risk associated with the driver and/or vehicle. Furthermore, processing by the analytics platform may conserve computing resources of one or more associated devices (e.g., a device associated with an entity interested in the driver risk score, such as an insurer), as the associated devices will not have to store, process, and/or send a vast amount of information used to generate the driver risk score. Further still, use of the analytics platform may conserve network resources, as only the computed risk scores need to be provided (e.g., to the associated devices, to a device associated with an entity).

Figure 1A:
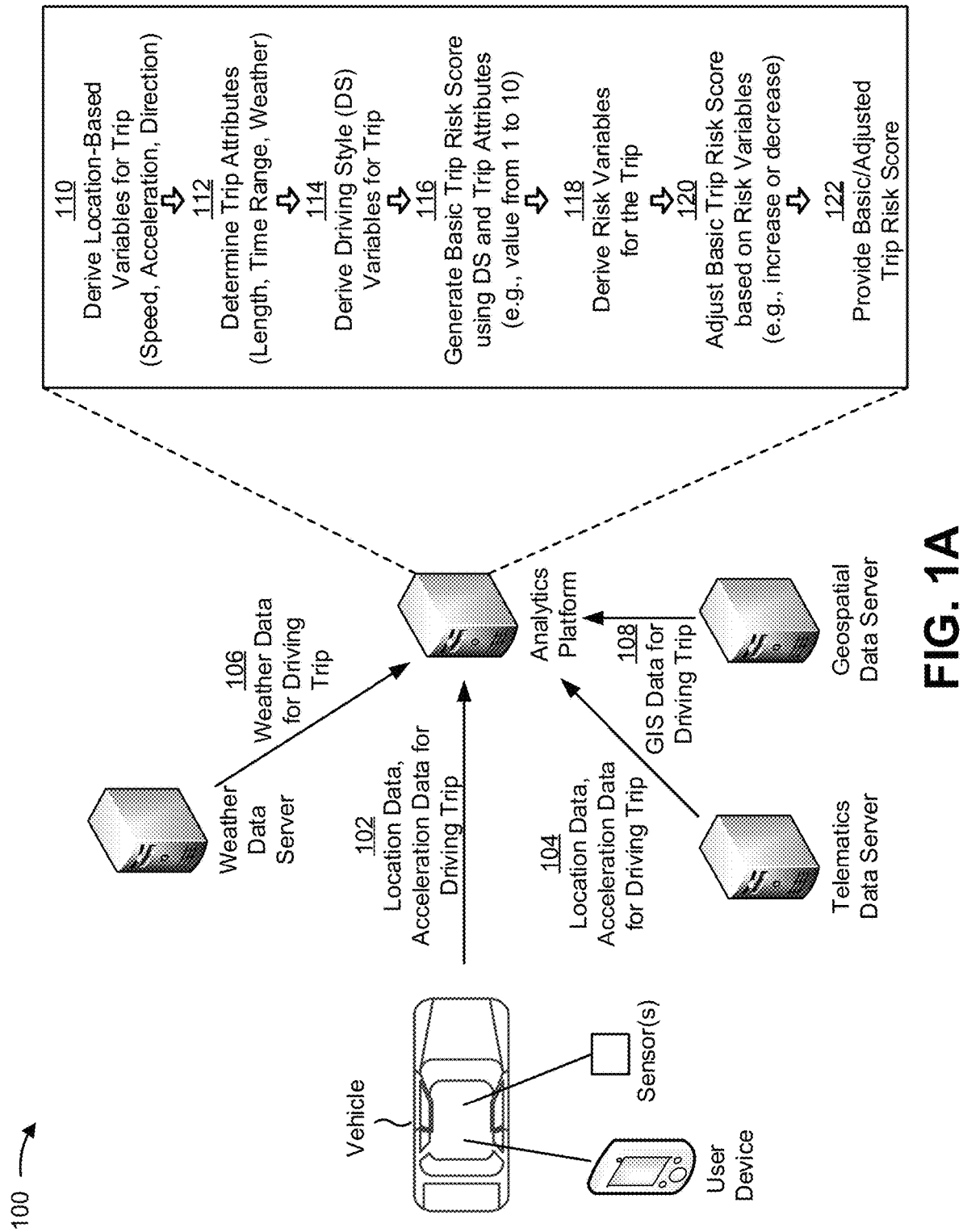
FIGS. 1A and 1B are diagrams of an overview of an example implementation described herein.
Figure 1B:
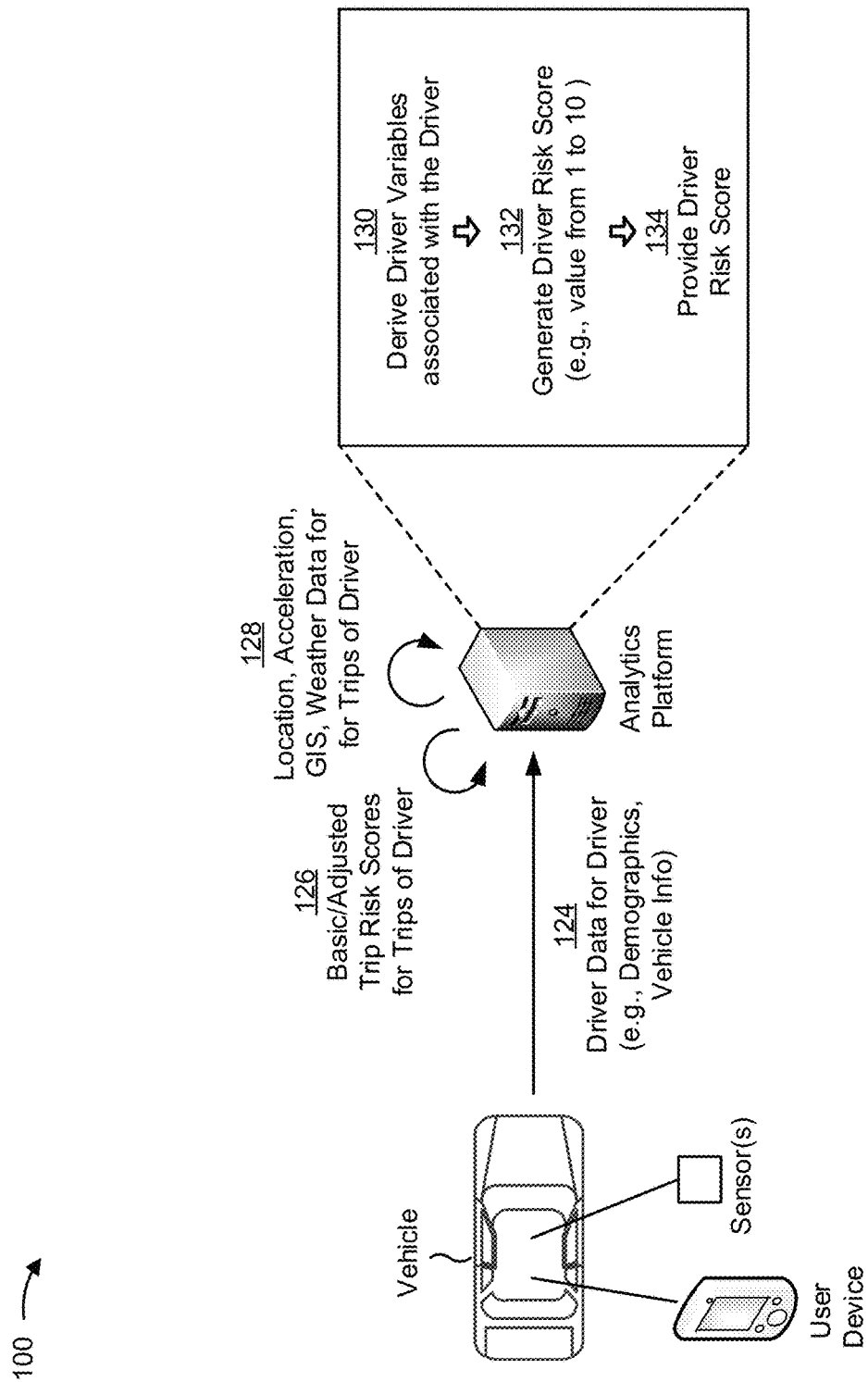

FIGS. 1A and 1B are diagrams of an overview of an example implementation 100 described herein. FIG. 1A shows an overview of a process associated with generating a basic trip risk score and/or an adjusted trip risk score for a driving trip taken by a vehicle. As shown in FIG. 1A, example implementation 100 may include an analytics platform that receives data from a number of different sources. Such sources may include a vehicle (e.g., including one or more sensors), a user device (e.g., located in the vehicle during the trip), a telematics data server, a weather data server, a geospatial data server, or the like. As shown by reference number 102, the analytics platform may receive, from the vehicle and/or the user device, location data and/or acceleration data for the driving trip. As shown by reference number 104, the analytics platform may receive, from the telematics data server, location data and/or acceleration data for the driving trip (e.g., when the location data and/or the acceleration data is stored by the telematics data server rather by the user device or the vehicle). As shown by reference number 106, the analytics platform may receive, from the weather data server, weather data for the driving trip. As shown by reference number 108, the analytics platform may receive, from the geospatial data server, geospatial data (e.g., geographical information system (GIS) data) for the driving trip.

As further shown in FIG. 1A, the analytics platform may derive one or more variables and/or attributes associated with the driving trip, and may generate a basic trip risk score based on the derived variables and/or attributes. As shown by reference number 110, the analytics platform may derive one or more location-based variables for the trip. The location-based variables may include variables, associated with the trip, related to speed of the vehicle, an acceleration of the vehicle, a direction of the vehicle (i.e., turning), or the like. In some implementations, the analytics platform may determine the location-based variables based on the location data associated with the trip.

As shown by reference number 112, the analytics platform may determine one or more trip attributes for a trip, such as a total distance of the trip or a percentage of the trip that was driven on a particular type of road, during a particular time of day, in a particular type of weather, or the like.

As shown by reference number 114, the analytics platform may derive one or more driving style variables for the trip. The driving style variables may include one or more variables associated with a manner in which the driver drives the vehicle during a particular trip, (e.g., as compared to a threshold, as compared to other drivers, or the like) such as one or more speed related driving style variables, one or more acceleration related driving style variables, one or more direction related driving style variables, or the like.

As shown by reference number 116, the analytics platform may generate a basic trip risk score based on the trip attributes and the driving style variables. As shown, the basic trip risk score may include a numerical value (e.g., from 1 to 10), a string value (e.g., high risk or low risk), or the like, that indicates a level of risk associated with the trip.

As further shown in FIG. 1A, the analytics platform may adjust and/or provide the trip risk score for use. As shown by reference number 118, the analytics platform may derive one or more risk variables for the trip, such as one or more high speed/acceleration variables, one or more jerk variables, one or more low speed/deceleration variables, one or more lane changing variables, one or more turn behavior variables, or the like. In some implementations, the analytics platform may identify an adjustment to be applied to the basic trip risk score based on the risk variables for the trip.

As shown by reference number 120, the analytics platform may adjust the basic trip risk score, based on identifying a risk adjustment and applying the risk adjustment, to create an adjusted trip risk score. As shown by reference number 122, the analytics platform may provide the basic trip risk score and/or the adjusted trip risk score, such as to a device associated with the driver, to an insurer device, to a storage device for storage, or the like.

FIG. 1B shows an overview of a process associated with generating a driver risk score for a driver of the vehicle. As shown by reference number 124, the analytics platform may receive, from the vehicle and/or the user device, driver data for the driver. The driver data may include, for example, information that identifies the driver, demographic information associated with the driver, information associated with insurance claims of the driver, information associated with moving violations and/or tickets associated with the driver, responses of the driver to behavioral questions, or the like.

As shown by reference number 126, the analytics platform may determine a set of trip risk scores, associated with the driver, such as basic trip risk scores or adjusted trip risk scores (e.g., determined in the manner described above) for a set of vehicle trips associated with the driver. As shown by reference number 128, the analytics platform may determine data associated with the set of trips, such as the location data associated with the set of trips, the geospatial data associated with the set of trips, the acceleration data associated with the set of trips, the weather data associated with the set of trips, or the like.

As shown by reference number 130, the analytics platform may derive one or more driver variables associated with a manner in which the vehicle is driven by the driver during the set of trips. As shown by reference number 132, the analytics platform may generate a driver risk score (e.g., a numerical value from 1 to 10, a string value such as "high risk" or "low risk", or the like) based on the driver variables, where the driver risk score indicates a level of risk associated with the driver. As shown by reference number 134, the analytics platform may provide the driver risk score, such as to a device associated with the driver, to an insurer device, to a storage device for storage, or the like.

In this way, the analytics platform may generate a driver risk score that more accurately assesses the driving risk associated with the driver and/or vehicle relative to an assessment based on telematics data alone. Furthermore, processing by the analytics platform may conserve computing resources of associated devices (e.g., a device associated with an entity interested in the driver risk score, such as an insurer), as the associated devices will not have to store, process, and/or send a vast amount of information used to generate the driver risk score. Further still, use of the analytics platform may conserve network resources, as only the computed risk scores need to be provided to the associated devices.

As indicated above, FIGS. 1A and 1B are provided merely as an example. Other examples are possible and may differ from what was described with regard to FIGS. 1A and 1B.

Figure 2:
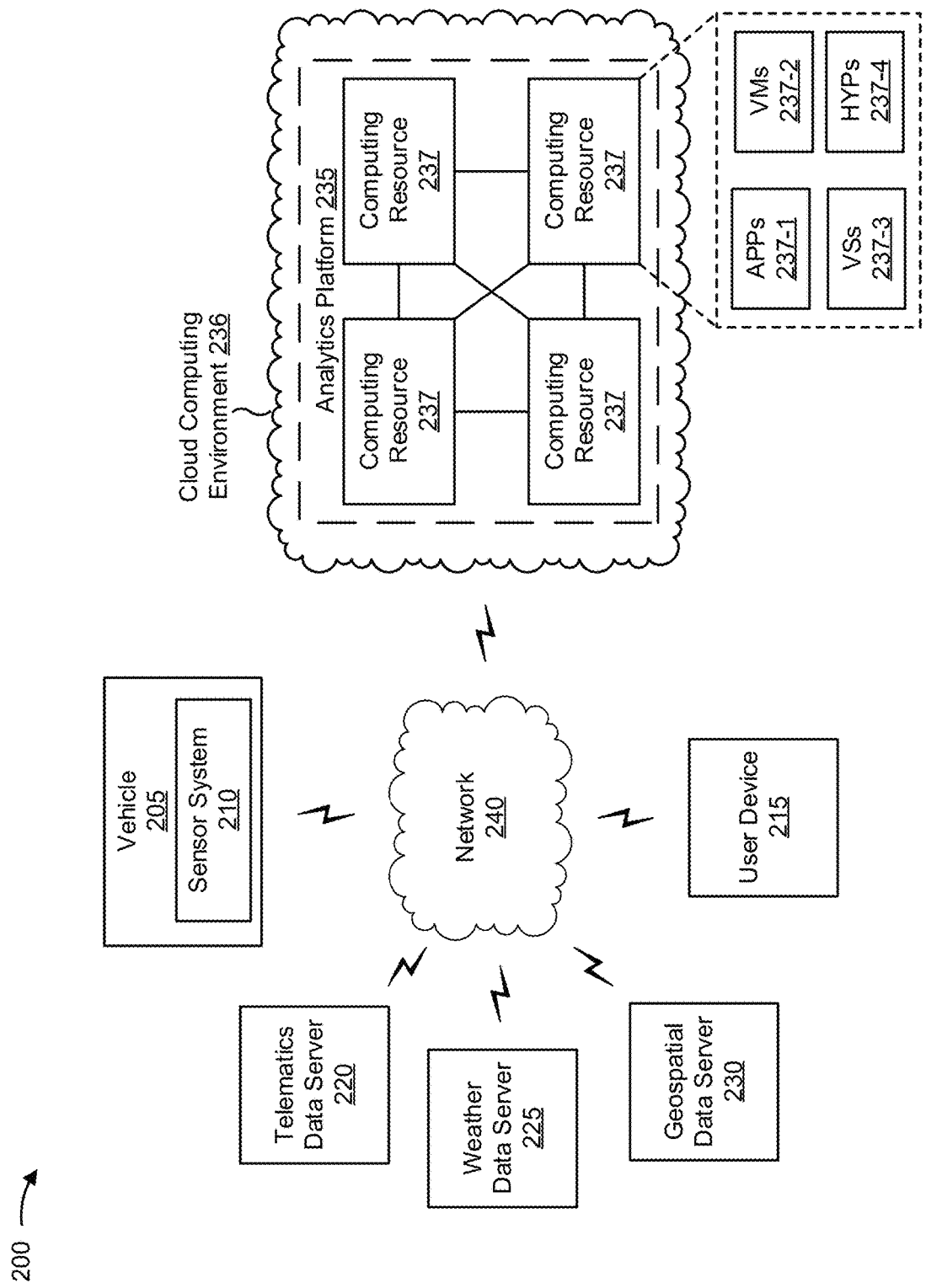
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a vehicle 205 (including a sensor system 210), a user device 215, a telematics data server 220, a weather data server 225, a geospatial data server 230, an analytics platform 235 hosted in cloud computing environment 236, and a network 240.

Vehicle 205 includes a vehicle, such as a car, a truck, a bus, or another type of vehicle (e.g., an aircraft, a boat, a train, or the like), that may be driven by a driver. In some implementations, vehicle 205 may include sensor system 210 and/or a vehicle computer capable of receiving, processing, storing, and/or providing information determined by one or more sensors of sensor system 210.

Sensor system 210 includes one or more devices (e.g., sensors) capable of receiving, determining, processing, storing, and/or providing telematics data associated with vehicle 205. For example, sensor system 210 may include an accelerometer, a speed sensor, a proximity sensor, a gyroscope, a global positioning system (GPS), a mobile device inside vehicle 205, a dongle, or the like. In some implementations, sensor system 210 may be mounted on, installed in, integrated into, or otherwise located in vehicle 205.

User device 215 includes one or more devices capable of receiving, generating, storing, processing, and/or providing data associated with generating a trip risk score and/or a driver risk score, as described herein. For example, user device 215 may include a communication and computing device, such as a mobile phone (e.g., a smart phone, a radiotelephone, etc.), a laptop computer, a desktop computer, a tablet computer, a handheld computer, a wearable communication device (e.g., a smart wristwatch, a pair of smart eyeglasses, etc.), or a similar type of device.

Telematics data server 220 includes one or more devices capable of receiving, generating, storing, processing, and/or providing telematics data associated with vehicle 205, such as accelerometer data, speed sensor data, proximity data, gyroscope data, GPS data, or the like. For example, telematics data server 220 may include a server or a group of servers. In some implementations, telematics data server 220 may receive information from and/or provide information to one or more other devices of environment 200. For example, telematics data server 220 may receive and store telematics data associated with vehicle 205, a driver of vehicle 205, and/or a trip of vehicle 205. In some implementations, telematics data server 220 may provide the telematics data to analytics platform 235 for analysis and/or processing by analytics platform 235, as described elsewhere herein.

Weather data server 225 includes one or more devices capable of receiving, generating, storing, processing, and/or providing weather data associated with a vehicle trip of vehicle 205. For example, weather data server 225 may include a server or a group of servers. In some implementations, weather data server 225 may receive information and/or provide information to one or more other devices of environment 200.

Geospatial data server 230 includes one or more devices capable of receiving, generating, storing, processing, and/or providing geospatial data (e.g., GIS data) associated with a trip of vehicle 205. For example, geospatial data server 230 may include a server or a group of servers. In some implementations, geospatial data server 230 may receive information and/or provide information to one or more other devices of environment 200.

Analytics platform 235 includes one or more devices capable of generating a basic trip risk score and/or an adjusted trip risk score, associated with a trip of vehicle 205, and/or a driver risk score associated with a driver of vehicle 205. For example, analytics platform 235 may include a server or a group of servers. In some implementations, analytics platform 235 may be capable of generating a trip analytic record in association with generating the basic and/or the adjusted trip risks score, and/or a driver analytic record in association with generating the driver risk score, as described herein. In some implementations, as shown, analytics platform 235 may be hosted in cloud computing environment 236. While implementations described herein describe analytics platform 235 as being hosted in cloud computing environment 236, in some implementations, analytics platform 235 may not be cloud-based or may be partially cloud-based.

Cloud computing environment 236 includes an environment that may host analytics platform 235. Cloud computing environment 236 may provide computation, software, data access, storage, etc. services that do not require end-user (e.g., user device 215 or another device of environment 200) knowledge of a physical location and configuration of system(s) and/or device(s) that hosts analytics platform 235. As shown, cloud computing environment 236 may include a group of computing resources 237 (referred to collectively as "computing resources 237" and individually as "computing resource 237").

Computing resource 237 may include one or more personal computers, workstation computers, server devices, or another type of computation and/or communication device. In some implementations, computing resource 237 may host analytics platform 235. The cloud resources may include compute instances executing in computing resource 237, storage devices provided in computing resource 237, data transfer devices provided by computing resource 237, or the like. In some implementations, computing resource 237 may communicate with other computing resources 237 via wired connections, wireless connections, or a combination of wired and wireless connections.

As further shown, computing resource 237 may include a group of cloud resources, such as one or more applications ("APPs") 237-1, one or more virtual machines ("VMs") 237-2, virtualized storage ("VSs") 237-3, one or more hypervisors ("HYPs") 237-4, or the like.

Application 237-1 may include one or more software applications that may be provided to or accessed by user device 215 or another device of environment 200. Application 237-1 may eliminate a need to install and execute the software applications on user device 215 or another device of environment 200. For example, application 237-1 may include software associated with analytics platform 235 and/or any other software capable of being provided via cloud computing environment 236. In some implementations, one application 237-1 may send/receive information to/from one or more other applications 237-1, via virtual machine 237-2.

Virtual machine 237-2 may include a software implementation of a machine (e.g., a computer) that executes programs like a physical machine. Virtual machine 237-2 may be either a system virtual machine or a process virtual machine, depending upon use and degree of correspondence to any real machine by virtual machine 237-2. A system virtual machine may provide a complete system platform that supports execution of a complete operating system. A process virtual machine may execute a single program, and may support a single process. In some implementations, virtual machine 237-2 may execute on behalf of a user (e.g., user device 215), and may manage infrastructure of cloud computing environment 236, such as data management, synchronization, or data transfers.

Virtualized storage 237-3 may include one or more storage systems and/or one or more devices that use virtualization techniques within the storage systems or devices of computing resource 237. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 237-4 may provide hardware virtualization techniques that allow multiple operating systems (e.g., "guest operating systems") to execute concurrently on a host computer, such as computing resource 237. Hypervisor 237-4 may present a virtual operating platform to the guest operating systems, and may manage the execution of the guest operating systems. Multiple instances of a variety of operating systems may share virtualized hardware resources.

Network 240 may include one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
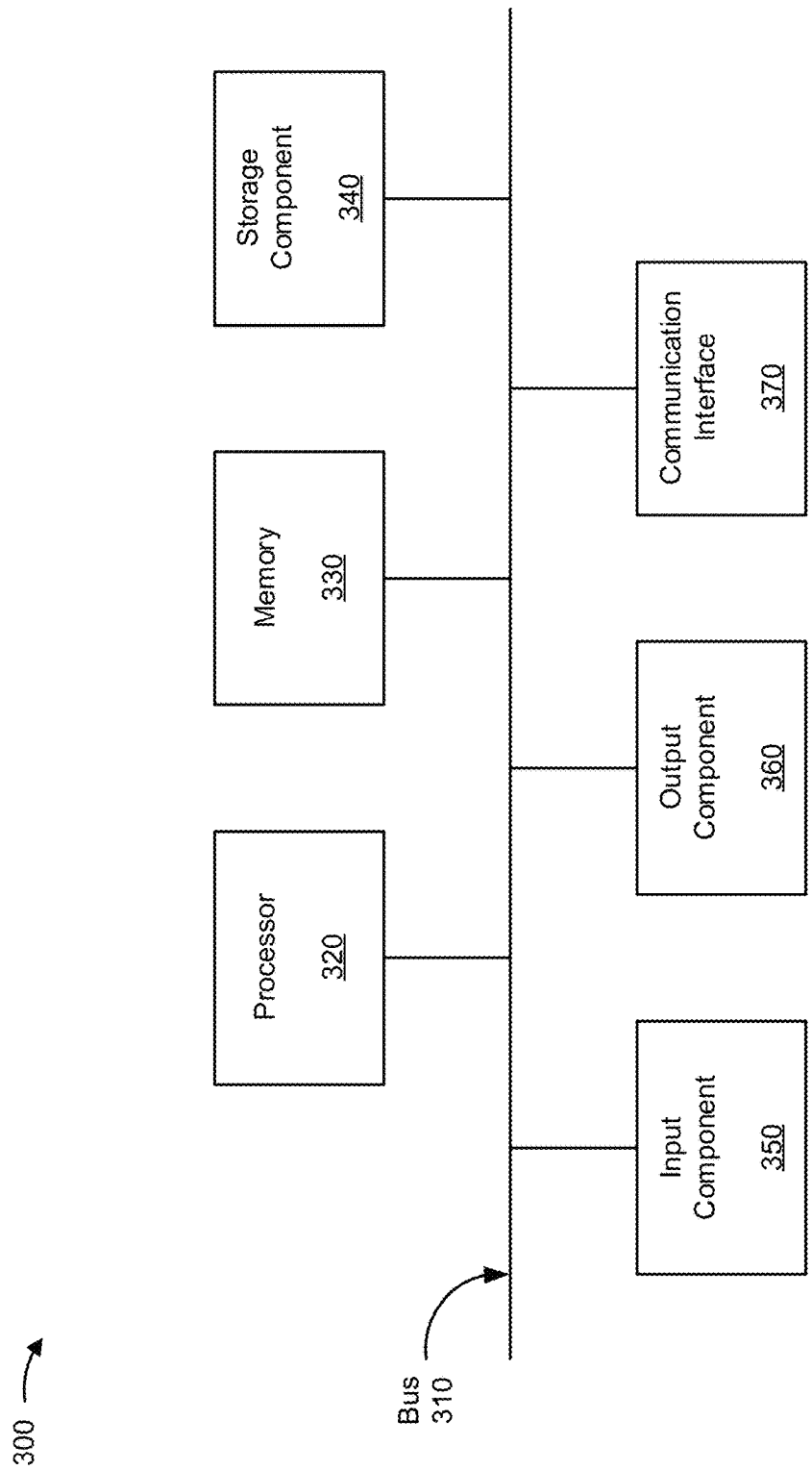
FIG. 3 is a diagram of example components of one or more devices of FIG. 2.

FIG. 3 is a diagram of example components of a device 300. Device 300 may correspond to vehicle 205, sensor system 210, user device 215, telematics data server 220, weather data server 225, geospatial data server 230, and/or analytics platform 235. In some implementations, vehicle 205, sensor system 210, user device 215, telematics data server 220, weather data server 225, geospatial data server 230, and/or analytics platform 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
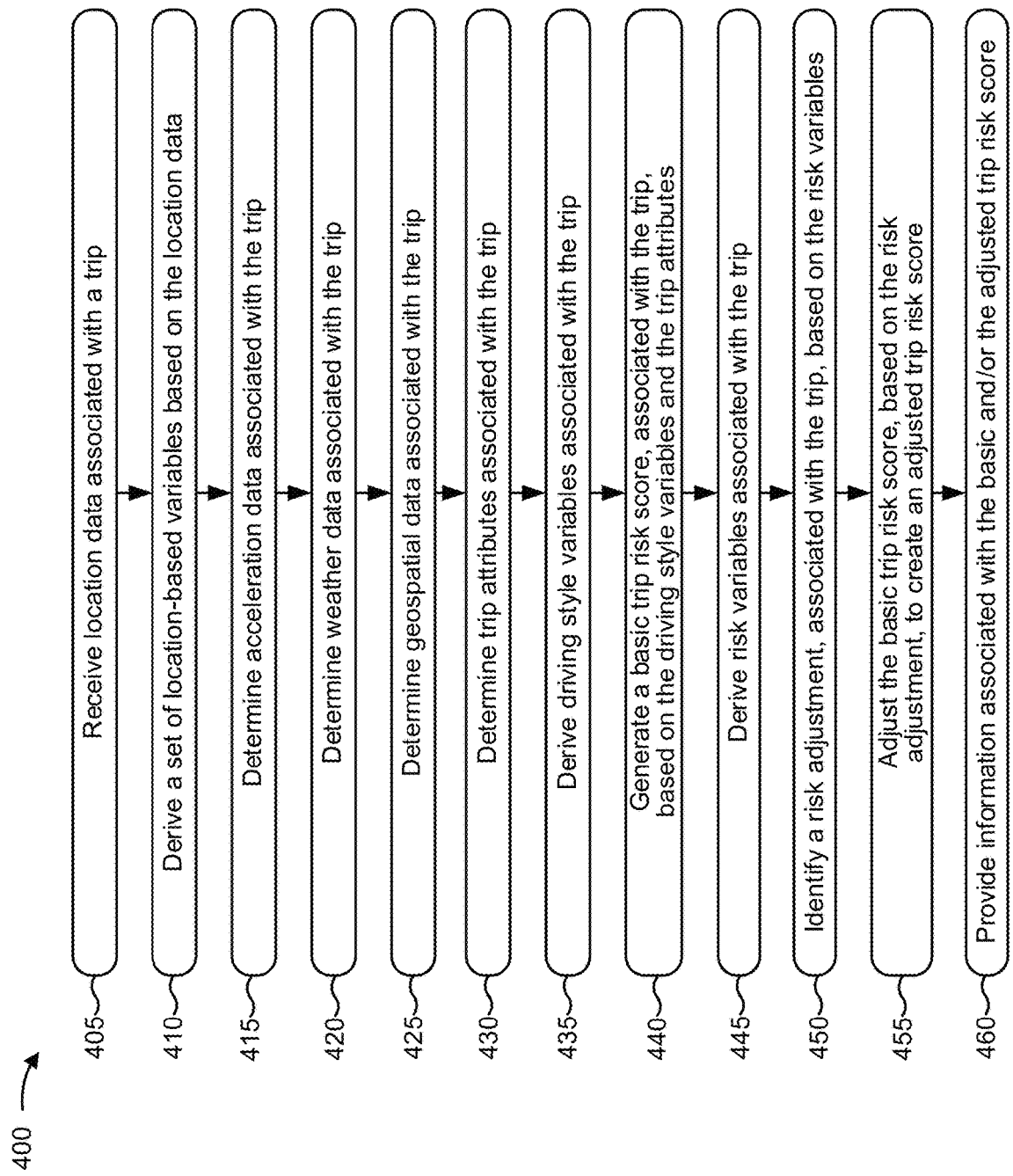
FIG. 4 is a flow chart of an example process for generating and providing a basic trip risk score and/or an adjusted trip risk score associated with a driving trip.

FIG. 4 is a flow chart of an example process 400 for generating and providing a basic trip risk score and/or an adjusted trip risk score associated with a driving trip. In some implementations, one or more process blocks of FIG. 4 may be performed by analytics platform 235. In some implementations, one or more process blocks of FIG. 4 may be performed by another device or a group of devices separate from or including analytics platform 235, such as one or more other devices of environment 200.

As shown in FIG. 4, process 400 may include receiving location data associated with a trip (block 405). For example, analytics platform 235 may receive location data associated with the trip. In some implementations, analytics platform 235 may receive the location data from vehicle 205, sensor system 210, user device 215, and/or telematics data server 220. Additionally, or alternatively, analytics platform 235 may derive the location data based on information provided by one or more of these devices.

The location data may include information that identifies a location of vehicle 205 during a driving trip. For example, the location data may include geographic coordinates, such as a latitude and a longitude (herein referred to as a latitude/longitude pair) that identifies a location, and/or a timestamp corresponding to the latitude/longitude pair. As a particular example, the location data may include multiple sets of GPS coordinates that identify the location of vehicle 205 at different times during the trip.

In some implementations, analytics platform 235 may associate a trip identifier (e.g., a trip name or a trip number) with the location data. Analytics platform 235 may use the trip identifier to identify the location data, associated with the trip, at a later time. Additionally, or alternatively, analytics platform 235 may associate a driver identifier, that identifies a driver of vehicle 205, with the location data. Analytics platform 235 may use the driver identifier to identify the location data, associated with the driver, at a later time.

In some implementations, analytics platform 235 may automatically receive the location data. For example, sensor system 210 may be configured to provide the location data automatically on a periodic basis when vehicle 205 is powered on or based on another indication that vehicle 205 is on a driving trip. As another example, user device 215 may be configured to provide the location data automatically on a periodic basis when user device 215 determines that a speed at which user device 215 is moving satisfies a threshold, when user device 215 is connected to a network associated with vehicle 205 (e.g., a local area network or personal area network of vehicle 205, such as a Bluetooth network of vehicle 205, a WiFi network of vehicle 205, or the like), when a user of user device 215 indicates that vehicle 205 is being driven, or based on another indication that vehicle 205 is on a driving trip.

In some implementations, analytics platform 235 may receive the location data based on sending a request. For example, analytics platform 235 may send a request to telematics data server 220. In this case, telematics data server 220 may provide the location data, based on the request, when telematics data server 220 stores the location data.

Additionally, or alternatively, analytics platform 235 may receive the location data based on user input. For example, a user of user device 215 (e.g., the driver of vehicle 205) may provide input indicating when a trip has started. Thereafter, user device 215 may begin providing the location data to analytics platform 235 periodically, such as based on a distance travelled (e.g., every 20 meters of movement, every 1 kilometer of movement, etc.) or based on an amount of time lapsed (e.g., every 0.1 seconds of time, every 1 minute, every 5 minutes, etc.) until the user provides input indicating that the trip has ended.

In some implementations, analytics platform 235 may sample the location data at an amount or rate significantly lower than that at which the location data is initially measured. For example, where the location data is measured every 20 meters of movement, analytics platform 235 may obtain, record, and/or store the location data every 100 meters of movement. In this way, data capture anomalies may be reduced and/or computing resources may be conserved relative to obtaining, recording, and/or storing all location data.

In some implementations, analytics platform 235 may receive the location data in real-time or near real-time (e.g., during a trip). Additionally, or alternatively, analytics platform 235 may receive the location data at a later time. For example, analytics platform 235 may receive the location data after a trip has taken place.

As further shown in FIG. 4, process 400 may include deriving a set of location-based variables based on the location data (block 410). For example, analytics platform 235 may derive the set of location-based variables. In some implementations, analytics platform 235 may derive the set of location-based variables when analytics platform 235 receives the location data.

In some implementations, a location-based variable may include a variable derived based on the location data associated with the trip, such as a speed related location-based variable (e.g., kilometers per hour, or meters per second). For example, analytics platform 235 may derive a speed of vehicle 205 based on a distance travelled (as determined by a difference in distance from a first latitude/longitude pair to a second latitude/longitude pair) and based on an amount of time elapsed (as determined by a difference between a first timestamp, associated with the first latitude/longitude pair, and a second timestamp, associated with the second latitude/longitude pair). In some implementations, analytics platform 235 may associate a timestamp with each speed related location-based variable (e.g., to indicate a speed at different times of the trip).

Additionally, or alternatively, a location-based variable may include an acceleration related location-based variable (e.g., an acceleration, a deceleration, or a change in acceleration). For example, analytics platform 235 may derive an acceleration of vehicle 205 based on a first derived speed of vehicle 205, a second derived speed of vehicle 205, and an amount of time between the first derived speed and the second derived speed. In some implementations, analytics platform 235 may associate a timestamp with each acceleration related location-based variable (e.g., to indicate an acceleration at different times of the trip).

Additionally, or alternatively, a location-based variable may include a turning related location-based variable (e.g., a degree of a vehicle turn, or a change in direction). For example, analytics platform 235 may derive a turning related location-based variable based on comparing a first direction of movement (e.g., from 0 degrees to 360 degrees), determined from a first latitude/longitude pair and a second latitude/longitude pair, to a second direction of movement determined from the second latitude/longitude pair and a third latitude/longitude pair. In some implementations, analytics platform 235 may associate a timestamp with each turning related location-based variable (e.g., a time of day, a date). In some implementations, analytics platform 235 may determine similar turning related variables in another manner, such as based on gyroscope data provided to analytics platform 235.

In some implementations, analytics platform 235 may derive multiple values of the location-based variables based on the location data. For example, analytics platform 235 may derive the speed of vehicle 205 multiple times, such as between and/or at every latitude/longitude pair included in the location data. In some implementations, analytics platform 235 may associate a timestamp with each derived location-based variable (e.g., a time of day, a date).

In some implementations, analytics platform 235 may categorize the location-based variables. For example, analytics platform 235 may categorize the location-based variables based on a time of day associated with the location-based variable (e.g., mid-night, early morning, daytime, afternoon, evening, or night). As another example, analytics platform 235 may categorize the location-based variable based on a threshold satisfied by the location-based variable (e.g., when a turning related location-based variable is greater than or equal to 90 degrees, when a speed related location-based variable exceeds 100 kilometers per hour, or the like).

In some implementations, analytics platform 235 may associate the trip identifier and/or the driver identifier with the location data and/or the derived location-based variables. In some implementations, analytics platform 235 may store the location data and/or the derived location-based variables, such that the location data and/or the location-based variables may be determined, based on the trip identifier and/or the driver identifier, at a later time.

As further shown in FIG. 4, process 400 may include determining acceleration data associated with the trip (block 415). For example, analytics platform 235 may determine acceleration data associated with the trip. In some implementations, analytics platform 235 may receive the acceleration data from vehicle 205, sensor system 210, user device 215, and/or telematics data server 220. Additionally, or alternatively, analytics platform 235 may derive the acceleration data based on information provided by one or more of these devices. For example, analytics platform 235 may derive the acceleration data based on the location data, as described above.

The acceleration data may include information that identifies an acceleration in one or more directions (e.g., an x-direction, a y-direction, and/or a z-direction) and/or a timestamp corresponding to a time the acceleration was measured. In some implementations, analytics platform 235 may receive the acceleration data in a manner similar to that described above in connection with receiving location data.

In some implementations, analytics platform 235 may adjust the acceleration data in order to account for gravity. Additionally, or alternatively, analytics platform 235 may adjust the acceleration data in order to account for an orientation of user device 215 that provides the acceleration data. Additionally, or alternatively, analytics platform 235 may adjust the acceleration data to account for a tilt angle of user device 215 that provides the acceleration data.

In some implementations, analytics platform 235 may associate the trip identifier and/or the driver identifier with the acceleration data. In this case, analytics platform 235 may store the acceleration data such that the acceleration data may be determined based on the trip identifier and/or the driver identifier at a later time.

As further shown in FIG. 4, process 400 may include determining weather data associated with the trip (block 420). For example, analytics platform 235 may receive the weather data. In some implementations, analytics platform 235 may receive the weather data from weather data server 225.

The weather data may include information that identifies a weather condition and/or a type of weather, such as a temperature, a visibility, a humidity, a type of precipitation, a precipitation intensity, a wind speed, an amount of cloud cover, or the like. In some implementations, the weather data may be associated with a particular geographical location and/or a particular time.

In some implementations, analytics platform 235 may determine the weather data based on a request. For example, analytics platform 235 may determine the weather data based on sending a request to weather data server 225. Additionally, or alternatively, analytics platform 235 may receive the weather data automatically (e.g., on a periodic basis during a trip). For example, analytics platform 235 may send, to weather data server 225, an indication that trip has started, and may receive the weather data based on sending the indication. Here, analytics platform 235 may send, to weather data server 225, and indication when the trip has stopped. As another example, analytics platform 235 may receive the weather and/or a weather forecast for a route associated with a trip (e.g., analytics platform 235 may gather GPS data from vehicle that indicates a route of the trip, and request weather forecast associated with the route). In this way, analytics platform 235 need only send one request and receive the weather data once, thereby conserving network resources. As another example, analytics platform 235 may periodically request the weather data at multiple locations along the trip, which may result in more accurate weather data (e.g., as compared to requesting the weather data based on a known route).

In some implementations, analytics platform 235 may determine the weather data based on the location data. For example, analytics platform 235 may determine the weather data corresponding to one or more locations (e.g., a start location of the trip, a middle location of the trip, and/or an end location of the trip) and/or times identified by the location data (e.g., based on sending, to weather data server 225, a request that includes information that identifies the location and a corresponding timestamp).

In some implementations, analytics platform 235 may categorize the weather data. For example, analytics platform 235 may categorize the weather at a particular location as clear when a value corresponding to an amount of cloud cover is in a first range of values (e.g., from 0.00 to less than 0.25), partly cloudy when the value is in a second range of values (e.g., from 0.25 to less than 0.94), and cloudy when the value is in a third range values (e.g., from 0.94 to 1.00).

As another example, analytics platform 235 may categorize the weather as foggy when a value corresponding to visibility satisfies a threshold (e.g., less than two kilometers). As another example, analytics platform 235 may categorize the weather as windy when a value corresponding to current wind speed satisfies a threshold (e.g., at least 18 kilometers per hour). As another example, analytics platform 235 may categorize the weather as rain when a value corresponding to precipitation type indicates rain. As another example, analytics platform 235 may categorize the weather as snow when a value corresponding to precipitation type indicates snow. As another example, analytics platform 235 may categorize the weather as "bad" or "good." Here, analytics platform 235 may categorize the weather as bad when the weather data indicates cloudy conditions, fog, wind, rain, snow, or the like. In some implementations, analytics platform 235 may determine a severity of such "bad" weather (e.g., where cloudy conditions are less severe than snow; where fog, wind, and rain is more severe than wind alone, or the like).

In some implementations, analytics platform 235 may associate the trip identifier and/or the driver identifier with the weather data. In this case, analytics platform 235 may store the weather data such that the weather data may be determined based on the trip identifier and/or the driver identifier at a later time.

As further shown in FIG. 4, process 400 may include determining geospatial data associated with the trip (block 425). For example, analytics platform 235 may determine geospatial data associated with the trip. In some implementations, analytics platform 235 may receive the geospatial data from geospatial data server 230.

The geospatial data may include information that identifies a type of location and/or a feature of a location. For example, the geospatial data may include information that identifies the location as a roadway. Here, the geospatial data may further include information that identifies a type of the roadway, such as a motorway, a highway, a motorway link, a service road, a primary/secondary/tertiary link, a ramp (e.g., an on-ramp or off-ramp), a residential roadway, a trunk, a cycle-way, a pathway, a dirt road, a gravel road, a city road, a country road, a scenic roadway, or the like. As another example, the geospatial data may include information that identifies a feature of the roadway (e.g., one-way, a number of lanes, a bridge, a tunnel, an age of the road, or a speed limit), or the like. As additional examples, the geospatial data may include information associated with traffic conditions (e.g., based on actual traffic at a particular time of the trip, average traffic conditions at the time, or overall), traffic accidents, construction, landmarks or points of interest, a quantity of accidents that occur on the roadway or at/near a location, or the like.

In some implementations, the geospatial data may identify the location as a natural location (e.g., a forest, a park, or a riverbank), a railway, a waterway, or the like. In some implementations, analytics platform 235 may be configured to disregard location data and/or location-based variables associated with a location if the location is not on a roadway on which vehicle 205 may drive, such as location data and/or location-based variables corresponding to a cycle-way, a walkway, a railway, a waterway, or another type of location on which vehicle 205 may not be driven. In some implementations, analytics platform 235 may conserve computing resources by disregarding such location data and/or location-based variables.

In some implementations, the geospatial data may be associated with a particular geographical area. For example, the geospatial data may be associated with an area bounded by three or more latitude/longitude pairs.

In some implementations, analytics platform 235 may determine the geospatial data based on a request. For example, analytics platform 235 may determine the geospatial data based on a sending a request to geospatial data server 230. Additionally, or alternatively, analytics platform 235 may receive the geospatial data automatically.

In some implementations, analytics platform 235 may determine the geospatial data based on the location data. For example, analytics platform 235 may determine geospatial data that corresponds to locations identified by the location data.

In some implementations, analytics platform 235 may associate the trip identifier and/or the driver identifier with the geospatial data. In this case, analytics platform 235 may store the geospatial data such that the geospatial data may be determined based on the trip identifier and/or the driver identifier at a later time.

As further shown in FIG. 4, process 400 may include determining trip attributes associated with the trip (block 430). For example, analytics platform 235 may determine trip attributes associated with the trip. In some implementations, analytics platform 235 may determine the trip attributes after analytics platform 235 receives the location data, the geospatial data, and/or the weather data.

The trip attributes may include a set of attributes that describe characteristics of a trip. For example, a trip attribute may include a total distance of the trip or a percentage of a total distance of the trip on which vehicle 205 was driven on a particular type of road (e.g., a motorway or a highway). As another example, a trip attribute may include a percentage of the total distance of the trip in which vehicle 205 was driven during evening peak hours (e.g., 5:00 PM to 9:00 PM) or a percentage of the total distance of the trip in which vehicle 205 was driven during night hours (e.g., 9:00 PM to Midnight). As another example, a trip attribute may include a percentage of the total distance of the trip in which vehicle 205 was driven during normal weather. As another example, a trip attribute may include a total number of turns during the trip that were greater than 90 degrees per kilometer.

In some implementations, analytics platform 235 may determine the trip attributes based on the location data, the geospatial data, and/or the weather data. For example, analytics platform 235 may determine a total distance of the trip (e.g., based on the location data) and may determine weather conditions at various points of the trip (e.g., based on the weather data). Here, analytics platform 235 may determine the percentage of the total distance of the trip in which vehicle 205 was driven during normal weather. In some implementations, the trip attributes may affect a basic trip risk score. For example, trip attributes that indicate a higher risk trip (e.g., a longer driving trip, a driving trip in poor weather conditions) may lead to generation of a basic trip risk score that indicates a higher level of risk as compared to a lower risk trip (e.g., a shorter driving trip, a driving trip in good weather conditions). Additional details regarding generation of a basic trip risk score are described below.

As further shown in FIG. 4, process 400 may include deriving driving style variables associated with the trip (block 435). For example, analytics platform 235 may derive driving style variables associated with the trip. In some implementations, analytics platform 235 may derive the driving style variables after analytics platform 235 derives the location-based variables based on the location data. Additionally, or alternatively, analytics platform 235 may derive the driving style variables based on receiving the geospatial data, the acceleration data, and/or the weather data.

A driving style variable may include a set of variables associated with a manner in which vehicle 205 is driven during the trip. For example, a driving style variable may include a variable that a driver of vehicle 205 is capable of controlling, such as a speed, an acceleration, a direction, a turn, a lane shift, or the like. In some implementations, analytics platform 235 may derive a driving style variable based on a location-based variable, the location data, the geospatial data, the acceleration data, and/or the weather data.

For example, the driving style variable may include one or more speed related variables associated with a speed of vehicle 205. As a particular example, a speed related variable may include a percentage of a first mile of the trip (i.e., a percentage of data records associated with the trip) that a speed of vehicle 205 exceeded a speed threshold (e.g., an average speed, a speed limit, etc.) defined for a particular geographical location. As another example, a speed related variable may include a percentage of the trip that a speed of vehicle 205 exceeded a speed threshold defined for a particular combination of geographical location and time of day. As yet another example, a speed related variable may include a percentage of the trip that a speed of vehicle 205 exceeded a speed threshold defined for a particular combination of geographical location and weather conditions. As still another example, a speed related variable may include a maximum speed of vehicle 205 during the trip. As another example, a speed related variable may include a percentage of a total distance travelled in which a speed of vehicle 205 exceeded a speed threshold defined for a particular geographical location. As an additional example, a speed related variable may include a percentage of the trip in which a speed of vehicle 205 exceeded a speed threshold defined for a particular combination of geographical location and road type.

Additionally, or alternatively, the driving style variable may include one or more acceleration related variables associated with an acceleration of vehicle 205. For example, an acceleration related variable may include a percentage of the trip in which a positive acceleration of vehicle 205 exceeded a positive acceleration threshold (e.g., an average positive acceleration) defined for a particular set of conditions, such as a particular combination of geographical location and weather conditions. As another example, an acceleration related variable may include a percentage of a first ten minutes of the trip that a change in positive or negative acceleration of vehicle 205 exceeded an acceleration threshold (e.g., an average change in positive or negative acceleration) defined for a particular geographical location. As yet another example, an acceleration related variable may include a percentage of the trip that a negative acceleration of vehicle 205 exceeded a negative acceleration threshold (e.g., an average negative acceleration) defined for a particular geographical location. As still another example, an acceleration related variable may include a maximum acceleration of vehicle 205 determined for the trip. As another example, an acceleration related variable may include a percentage of the trip that a positive forward acceleration of vehicle 205 exceeded a positive forward acceleration threshold (e.g., an average positive forward acceleration). As an additional example, an acceleration related variable may include a percentage of the trip that a positive upward acceleration of vehicle 205 exceeded a positive upward acceleration threshold (e.g., an average positive upward acceleration).

Additionally, or alternatively, the driving style variable may include one or more direction related variables associated with a direction of vehicle 205. For example, a direction related variable may include a percentage of turns of vehicle 205 during the trip that exceeded a particular angle (e.g., 60 degrees, 90 degrees, 135 degrees, etc.), and during which positive acceleration exceeded a positive acceleration threshold (e.g., for a particular combination of geographical location and time of day). As another example, a direction related variable may include a percentage of time of the trip that a positive sideways acceleration of vehicle 205 exceeded a positive sideways acceleration threshold or a negative sideways acceleration of vehicle 205 exceeded a negative sideways acceleration threshold. As yet another example, a direction related variable may include an average positive forward acceleration of vehicle 205 when a positive sideways acceleration of vehicle 205 exceeded a positive sideways acceleration threshold (e.g., a $90^{th}$ percentile of positive sideways acceleration determined based on data associated with multiple drivers) and when a negative sideways acceleration of vehicle 205 did not exceed a negative sideways acceleration threshold (e.g., a $10^{th}$ percentile of negative sideways acceleration determined based on data associated with multiple drivers). As still another example, a direction related variable may include a percentage of turns of vehicle 205 during the trip that exceeded a particular angle, and during which a speed of vehicle 205 exceeded a speed threshold (e.g., an average speed) for a particular combination of geography and time of day. As another example, a direction related variable may include a percentage of the trip that a positive sideways acceleration of vehicle 205 exceeded a positive sideways acceleration threshold. As yet another example, a direction related variable may include a percentage of the trip that a negative sideways acceleration of vehicle 205 exceeded a negative sideways acceleration threshold.

As further shown in FIG. 4, process 400 may include generating a basic trip risk score, associated with the trip, based on the driving style variables and the trip attributes (block 440). For example, analytics platform 235 may generate a basic trip risk score, associated with the trip, based on the driving style variables and the trip attributes. In some implementations, analytics platform 235 may generate the basic trip risk score after analytics platform 235 derives the driving style variables associated with the trip.

The basic trip risk score may include a metric that indicates a level of risk associated with the trip, such as a numerical value (e.g., from 1 to 10), a string value (e.g., high risk or low risk), or the like, indicating a risk level from high to low. In some implementations, analytics platform 235 may generate the basic trip risk score based on the driving style variables and the trip attributes. For example, analytics platform 235 may have access to information that identifies a set of speed categories, a set of acceleration categories, a set of direction categories, and a set of trip categories. Here, each set of categories may identify a set of scores that correspond to each category of the set of categories.

FIGS. 5A and 5B show an example group of categories associated with generating the basic trip risk score. As shown in FIG. 5A, a set of speed categories may include five categories (e.g., segments 1 through 5 under "Speed"), where each category may be associated with a score (e.g., from 10 to 1) and a corresponding description. Here, a higher value score indicates a lower level of risk, and vice-versa. In this example, each speed category may be associated with a set or a range of values for each of the speed related driving style variables. In some implementations, analytics platform 235 may identify the set or the range of values, associated with the each category, using an analytical technique, such as a k-clustering technique. Here, analytics platform 235 may compare the speed related driving style variables, associated with the trip, to the set or the range of values associated with each speed category, and may identify a speed category to which the trip belongs, and a corresponding speed score, based on the comparison.

For example, analytics platform 235 may compare the values of the speed related driving style variables, associated with the trip, to the speed related driving style variable values corresponding to each speed category of the set of speed categories. Here, analytics platform 235 may, based on the comparison, identify a particular speed category that matches (e.g., falls within a threshold, or falls within a range of values) the speed related driving style variables associated with the trip. Analytics platform 235 may then identify a speed score corresponding to the identified speed category.

Analytics platform 235 may determine an acceleration score and a direction score in a similar manner. Further, analytics platform 235 may determine a trip score, based on the trip attributes, in a similar manner. Example sets of trip categories (e.g., segments 1 through 7 under "Trip Attributes"), acceleration categories (e.g., segments 1 through 9 under "Acceleration"), and direction categories (e.g., segments 1 through 7 under "Direction") are further shown in FIGS. 5A and 5B. In this way, analytics platform 235 may determine a speed score, an acceleration score, a direction score, and a trip score associated with the trip. Notably, the tables shown in FIGS. 5A and 5B are provided merely as examples associated with determining the speed score, the acceleration score, the direction score, and the trip score, and other examples are possible.

Figure 6B:

In some implementations, analytics platform 235 may generate the basic trip risk score based on the speed score, the acceleration score, the direction score, and/or the trip score. FIGS. 6A-6C show example tables associated with generating the basic trip risk score based on the speed score, the acceleration score, the direction score, and/or the trip score. With respect to the example tables shown in FIG. 6A-6C, different driving styles may be considered more safe or less safe in different driving conditions, and this combination is used to get a more accurate trip risk score based on the driving style and the driving conditions.

For example, as shown in FIG. 6A, analytics platform 235 may determine, based on an entry corresponding to a column and a row associated with the trip score and the speed score, respectively, a speed score with respect to the trip score (herein referred to as a speed/trip score). As shown in FIG. 6B, analytics platform 235 may determine, based on an entry corresponding to a column and a row associated with the trip score and the acceleration score, respectively, an acceleration score with respect to the trip score (herein referred to as an acceleration/trip score). As shown in FIG. 6C, analytics platform 235 may determine, based on an entry corresponding to a column and a row associated with the trip score and the direction score, respectively, a direction score with respect to the trip score (herein referred to as a direction/trip score).

In some implementations, analytics platform 235 may generate the basic trip risk score based on the speed/trip score, the acceleration/trip score, and/or the direction/trip score. For example, analytics platform 235 may generate the basic trip risk score based on summing the speed/trip score, the acceleration/trip score, and the direction/trip score.

Additionally, or alternatively, analytics platform 235 may generate the basic trip risk score by applying a set of weight factors to the speed/trip score, the acceleration/trip score, and/or the direction/trip score. For example, analytics platform 235 may multiply the speed/trip score by a first weight factor (e.g., 0.5), the acceleration/trip score by a second weight factor (e.g., 0.3), and the direction/trip score by a third weight factor (e.g., 0.2). Here, analytics platform 235 may sum the weighted scores in order to generate the basic trip risk score.

Returning to FIG. 4, as further shown, process 400 may include deriving risk variables associated with the trip (block 445). For example, analytics platform 235 may derive risk variables associated with the trip. In some implementations, analytics platform 235 may derive the risk variables after analytics platform 235 derives the location-based variables. Additionally, or alternatively, analytics platform 235 may derive the driving style variables when analytics platform 235 receives the geospatial data, the acceleration data, and/or the weather data. Additionally, or alternatively, analytics platform 235 may derive the risk variables after analytics platform 235 generates the basic risk score. In some implementations, the risk variables may be used to identify a risk adjustment associated with adjusting the basic trip risk score, as described below.

The risk variables may include a set of variables that identify a riskiness of behavior (high risk or low risk behavior) associated with a manner in which vehicle 205 is driven during the trip. For example, a risk variable may include one or more high speed/acceleration variables. As a particular example, a high speed/acceleration variable may include a percentage of the trip in which a positive forward acceleration of vehicle 205 exceeded a positive forward acceleration threshold (e.g., a $90^{th}$ percentile of forward positive acceleration). As another example, a high speed/acceleration variable may include a percentage of the trip that a speed of vehicle 205 exceeded a speed threshold (e.g., a $90^{th}$ percentile of speed). As yet another example, a high speed/acceleration variable may include a percentage of the first mile of the trip that a speed of vehicle 205 exceeded a speed threshold (e.g., a $90^{th}$ percentile of speed). As yet another example, a high speed/acceleration variable may include a percentage of the trip that a speed of vehicle 205 exceeded a maximum speed (e.g., a speed limit) for an applicable road type.

As still another example, a high speed/acceleration variable may include a percentage of a first mile of the trip that an acceleration of vehicle 205 exceeded an acceleration threshold for a particular road type. As still another example, a high speed/acceleration variable may include a percentage of the first mile of the trip that a speed of vehicle 205 exceeded a speed threshold for a particular geographical location. As another example, a high speed/acceleration variable may include a percentage of the first mile of the trip that an acceleration of vehicle 205 exceeded an acceleration threshold for a particular geographical location. As yet another example, a high speed/acceleration variable may include a percentage of the trip that an acceleration of vehicle 205 exceeded an acceleration threshold for a particular combination of geographical location and weather type. Additionally, or alternatively, a high speed/acceleration variable may include a percentage of distance travelled during which a speed of vehicle 205 exceeded a speed threshold. As an additional example, a high speed/acceleration variable may include a percentage of the trip that an acceleration of vehicle 205 exceeded an acceleration threshold (e.g., a $90^{th}$ percentile of acceleration).

Additionally, or alternatively, the risk variables may include one or more jerk variables. For example, a jerk variable may include a percentage of the trip that a change in acceleration of vehicle 205 exceeded a change in an acceleration threshold (e.g., a $90^{th}$ percentile determined based on data associated with multiple drivers). As an additional example, a jerk variable may include a percentage of the first mile of the trip that a change in acceleration of vehicle 205 exceeded a change in acceleration threshold. As another example, a jerk variable may include a percentage of the first mile of the trip that a change in acceleration of vehicle 205 exceeded a change in acceleration threshold defined for a particular combination of geographical location and weather type.

Additionally, or alternatively, the risk variables may include one or more low speed/deceleration variables. For example, a low speed/deceleration variable may include a percentage of the trip that a deceleration of vehicle 205 does not exceed a deceleration threshold (e.g., a $10^{th}$ percentile of deceleration determined based on data associated with multiple drivers). As another example, a low speed/deceleration variable may include a percentage of the trip that a speed of vehicle 205 does not exceed a speed threshold (e.g., a $10^{th}$ percentile of speed determined based on data associated with multiple drivers) for a particular combination of geographical location and time of day. As yet another example, a low speed/deceleration variable may include a percentage of the trip that a speed of vehicle 205 does not exceed a speed threshold for a particular combination of geographical location and weather type. As still another example, a low speed/deceleration variable may include a percentage of the trip that a deceleration of vehicle 205 does not exceed a deceleration threshold for a particular place type (e.g., a high speed area, a county/hamlet, a community area, a locality/subdivision, a town/city/suburb, or a district/state). As yet another example, a low speed/deceleration variable may include a percentage of the first mile of the trip that a deceleration of vehicle 205 does not exceed a deceleration threshold for a particular place type.

As still another example, a low speed/deceleration variable may include a percentage of the trip that a deceleration of vehicle 205 does not exceed a deceleration threshold for a particular road type. As an additional example, a low speed/deceleration variable may include a percentage of the first mile of the trip that a deceleration of vehicle 205 does not exceed a deceleration threshold for a particular road type. As another example, a low speed/deceleration variable may include a percentage of the trip that a deceleration of vehicle 205 does not exceed a deceleration threshold.

Additionally, or alternatively, the risk variables may include one or more lane changing variables. For example, a lane changing variable may include a percentage of the trip that number of sign flips (e.g., accelerometer data readings that change from positive to negative or from negative to positive), per period of time, exceed a sign flip threshold (e.g., a $90^{th}$ percentile of sign flips determined based on data associated with multiple drivers).

Additionally, or alternatively, the risk variables may include one or more turn behavior variables. For example, a turn behavior variable may include a percentage the trip that a speed of vehicle 205 exceeded a speed threshold (e.g., a $90^{th}$ percentile of speed determined based on data associated with multiple drivers) when a turning angle of vehicle 205 is greater than 90 degrees for a particular geographical location. As another example, a turn behavior variable may include a percentage of the trip that an acceleration of vehicle 205 exceeded an acceleration threshold (e.g., a $90^{th}$ percentile of acceleration determined based on data associated with multiple drivers) when a turning angle is greater than 90 degrees, for a particular combination of geographical location and time of day. As yet another example, a turn behavior variable may include a percentage of the trip that an acceleration of vehicle 205 exceeded an acceleration threshold when a turning angle is greater than 90 degrees, for a particular geographical location.

As further shown in FIG. 4, process 400 may include identifying a risk adjustment, associated with the trip, based on the risk variables (block 450). For example, analytics platform 235 may identify a risk adjustment, associated with the trip, based on the risk variables. In some implementations, analytics platform 235 may identify the risk adjustment after analytics platform 235 derives the risk variables associated with the trip. Additionally, or alternatively, analytics platform 235 may identify the risk adjustment after analytics platform 235 generates the basic trip risk score.

The risk adjustment may indicate an amount by which the basic trip risk score may be modified (e.g., increased or decreased) due to the occurrence (or non-occurrence) of high risk or low risk events during the trip. For example, the risk adjustment may include a factor by which the basic risk score is decreased (e.g., to indicate a higher risk trip) when more than a first threshold (e.g., high) number of high risk events occur during the trip. As another example, the risk adjustment may include a factor by which the basic risk score is decreased (e.g., to indicate a lower risk trip) when less than a second threshold (e.g., low) number of high risk events occur during the trip.

In some implementations, analytics platform 235 may identify the risk adjustment based on the risk variables. For example, analytics platform 235 may sum a number of instances that one or more risk variables (e.g., a particular risk variable, multiple particular risk variables, or any risk variables) satisfy a particular threshold (e.g., are at or above a $90^{th}$ percentile of the risk variable as compared to other trips and/or other drivers). Here, analytics platform 235 may identify a risk adjustment based on the total number of instances and a risk adjustment table accessible by analytics platform 235. For example, a first total (e.g., three or fewer instances of any risk variables being at or above the $90^{th}$ percentile) may cause analytics platform 235 to identify a first adjustment (e.g., a multiplication factor of 1), a second total (e.g., four to seven instances of any risk variables being at or above the $90^{th}$ percentile) may cause analytics platform 235 to identify a second adjustment (e.g., a multiplication factor of 0.5), a third total (e.g., more than seven instances of any risk variables being at or above the $90^{th}$ percentile) may cause analytics platform 235 to identify a third adjustment (e.g., a multiplication factor of 0.1), etc.

As another example, analytics platform 235 may sum a number of categories of risk variables (e.g., high/speed acceleration risk variables, jerk risk variables, low/speed acceleration risk variables, lane changing risk variables, turn behavior risk variables, etc.) in which a risk variable satisfies a threshold during the trip. Here, analytics platform 235 may identify the risk adjustment based on the total number of categories in which any risk variable satisfies a corresponding threshold (e.g., where more risk categories lead to an adjustment associated with lowering the risk score to indicate a riskier trip).

As further shown in FIG. 4, process 400 may include adjusting the basic trip risk score, based on the risk adjustment, to create an adjusted trip risk score (block 455). For example, analytics platform 235 may adjust the basic trip risk score, based on the risk adjustment, to create an adjusted trip risk score. In some implementations, analytics platform 235 may adjust the basic trip risk score after analytics platform 235 identifies the risk adjustment.

In some implementations, analytics platform 235 may adjust the basic trip risk score by applying the adjustment factor to the basic trip risk score. For example, analytics platform 235 may adjust the basic trip risk score by adding the adjustment factor to the basic trip risk score, by multiplying the basic trip risk score by the adjustment factor, or the like.

As further shown in FIG. 4, process 400 may include providing information associated with the basic and/or the adjusted trip risk score (block 460). For example, analytics platform 235 may provide information associated with the basic and/or the adjusted trip risk score. In some implementations, analytics platform 235 may provide the information associated with the basic trip risk score and/or the adjusted trip risk score after analytics platform 235 generates the basic trip risk score or the adjusted trip risk score, respectively.

In some implementations, analytics platform 235 may provide the information associated with the basic trip risk score and/or the adjusted trip risk score for storage. For example, analytics platform 235 may provide the information associated with the basic trip risk score and/or adjusted trip risk score for storage such that analytics platform 235 or another device may access the information associated with the basic trip risk score and/or adjusted trip risk score at a later time. In some implementations, analytics platform 235 may associate the trip identifier and/or the driver identifier with the basic/adjusted trip risk scores, and may store the basic/adjusted trip risk scores, such that analytics platform 235 or another device may determine a set of trip risk scores associated with the driver at a later time.

Additionally, or alternatively, analytics platform 235 may provide the information associated with the basic trip risk score and/or the adjusted trip risk score for display to the driver (e.g., the user of user device 215) such that the driver may view the basic trip risk score and/or adjusted trip risk score. In some implementations, analytics platform 235 may provide information that identifies one or more risk events (e.g., location data, a timestamp, or a risk variable value) such that the driver may be provided with information that identifies risky driving habits. This may increase roadway safety, as drivers may be made aware of risky behavior and may alter driving habits accordingly.

In some implementations, analytics platform 235 may provide the information associated with the basic trip risk score and/or the adjusted trip risk score as an alert while the driver is driving. Here, the alert may be an audible alert provided via user device 215 (such that driver does not have to take his eyes off the road).

Additionally, or alternatively, the alert may be provided to vehicle 205 (e.g., to a display on a dashboard). Additionally, or alternatively, the alert may cause vehicle 205 to be automatically controlled (e.g., slow down the vehicle, prevent driving above a threshold speed, etc.). Additionally, or alternatively, analytics platform 235 may identify other vehicles 205 in proximity to vehicle 205 and provide an alert of the risky driver to drivers of the other vehicles 205. Here, the alert may indicate, for example, that there is a risky driver in proximity, identify the make, model, and color of vehicle 205, or the like.

Additionally, or alternatively, analytics platform 235 may provide the information associated with the basic and/or the adjusted trip risk score to cause an action to be automatically performed. For example, analytics platform 235 may provide the information associated with the basic trip risk score and/or the adjusted trip risk score to an insurer device, associated with an insurer of the driver, in order to allow the insurer to automatically determine and/or update an insurance rate associated with the driver, to automatically generate a notification associated with reevaluation of the insurance rates of the driver, or the like. Additionally, or alternatively, analytics platform 235 may receive information associated with the driver's current insurance rates, and provide a recommendation to increase or decrease the current insurance rates by a particular amount based on the basic and/or the adjust trip risk score.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 7:
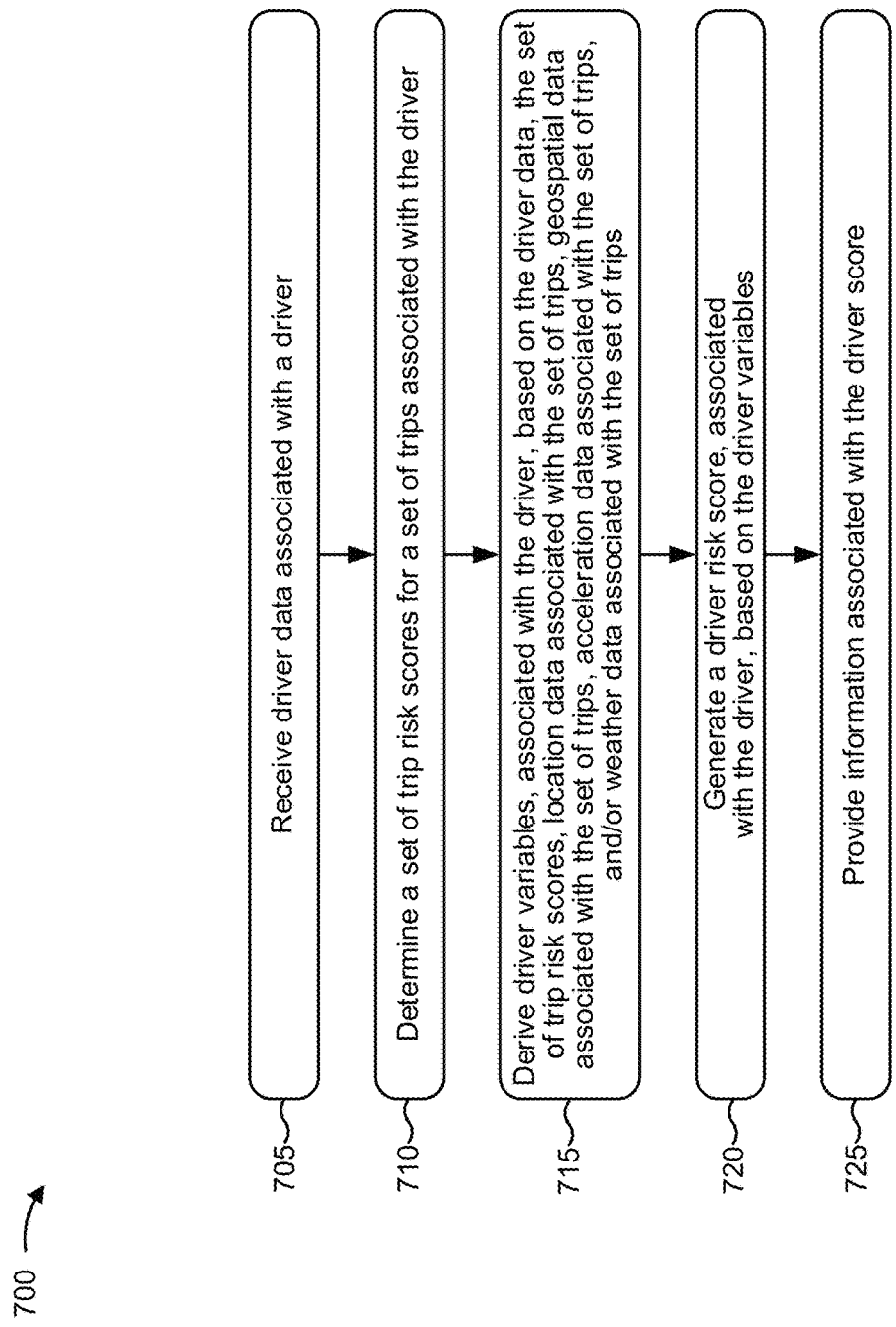
FIG. 7 is a flow chart of an example process for generating and providing a driver risk score associated with a driver.

FIG. 7 is a flow chart of an example process 700 for generating and providing a driver risk score associated with a driver. In some implementations, one or more process blocks of FIG. 7 may be performed by analytics platform 235. In some implementations, one or more process blocks of FIG. 7 may be performed by another device or a group of devices separate from or including analytics platform 235, such as one or more other devices of environment 200.

As shown in FIG. 7, process 700 may include receiving driver data associated with a driver (block 705). For example, analytics platform 235 may receive driver data associated with a driver. In some implementations, analytics platform 235 may receive the driver data from vehicle 205, sensor system 210, and/or user device 215.

The driver data may include information associated with a driver (e.g., a user of user device 215), such as information that identifies the driver (e.g., a name, an identification number, or a license number), an age of the driver, a gender of the driver, a license type associated with the driver, an education level of the driver, an income level of the driver, or the like. As another example, the driver data may include information associated with previously filed insurance claims (e.g., a date, a claim number, or a description of the claim), previous moving violations and/or tickets (e.g., a date, a type, or a description), or the like, associated with the driver. As yet another example, the driver data may include responses to driving related behavioral questions. For example, the driver data may include information indicating that the driver never exceeds a speed limit, always comes to a complete stop at a stop sign, or the like.

In some implementations, the driver data may include information associated with vehicle 205. For example, the driver data may include a make, a model, a color, and/or a year associated with vehicle 205. As another example, the driver data may include information associated with previously filed insurance claims (e.g., a date, a claim number, or a description of the claim), previous moving violations and/or tickets (e.g., a date, a type, or a description), or the like, associated with the vehicle.

As further shown in FIG. 7, process 700 may include determining a set of trip risk scores for a set of trips associated with the driver (block 710). For example, analytics platform 235 may determine a set of trip risk scores for a set of trips associated with the driver. In some implementations, analytics platform 235 may determine the set of trip risk scores when (e.g., before, after, concurrently with) analytics platform 235 receives the driver data.

In some implementations, the set of trip risk scores may include one or more basic trip risk scores, associated with the driver, and/or one or more adjusted trip risk scores associated with the driver, as described above in connection with FIG. 4. In some implementations, analytics platform 235 may determine the set of trip risk scores based on information that identifies the driver and information stored or accessible by analytics platform 235. For example, analytics platform 235 may search trip risk scores, determined and stored by analytics platform 235 in the manner described herein, using the driver identifier. Here, analytics platform 235 may identify the set of trip risk scores as a set of trip risk scores that are associated with the driver identifier.

As further shown in FIG. 7, process 700 may include deriving driver variables, associated with the driver, based on the driver data, the set of trip risk scores, location data associated with the set of trips, geospatial data associated with the set of trips, acceleration data associated with the set of trips, and/or weather data associated with the set of trips (block 715). For example, analytics platform 235 may derive driver variables, associated with the driver, based on the driver data, the set of trip risk scores, location data associated with the set of trips, geospatial data associated with the set of trips, acceleration data associated with the set of trips, and/or weather data associated with the set of trips. In some implementations, analytics platform 235 may derive the driver variables after analytics platform 235 determines the set of trip risk scores associated with the driver. Additionally, or alternatively, analytics platform 235 may derive the driver variables when analytics platform 235 receives the driver data, the geospatial data, the acceleration data, and/or the weather data. In some implementations, the driver variables may be used to generate a driver risk score, as described below.

The driver variables may include a set of variables associated with a manner in which vehicle 205 is driven by a driver during multiple trips. In other words, the driver variables are variables associated with the driver across multiple trips, rather than variables associated with a driving style during a single trip. For example, a driver variable may include a percentage of the one or more trips, associated with the driver, that a speed of vehicle 205 exceeded a speed threshold (e.g., an average speed) defined for a particular combination of geography and time of day. As another example, a driver variable may include a percentage of a first ten minutes of the one or more trips, associated with the driver, that a change in positive or negative acceleration of vehicle 205 exceeded a threshold (e.g., an average change in positive or negative acceleration) defined for a particular geographical location. As another example, a driver variable may include a percentage the one or more trips, associated with the driver, that a number of sign flips, per period of time, exceed a sign flip threshold.

Here, analytics platform 235 may determine the location data, the geospatial data, the acceleration data, and/or the weather data based on the driver identifier (e.g., by searching data, accessible by analytics platform 235, using the driver identifier).

As further shown in FIG. 7, process 700 may include generating a driver risk score, associated with the driver, based on the driver variables (block 720). For example, analytics platform 235 may generate a driver risk score, associated with the driver, based on the driver variables. In some implementations, analytics platform 235 may generate the driver risk score after analytics platform 235 derives the driver variables associated with the driver. The driver risk score may include a metric that indicates a level of risk associated with the driver, such as a numerical value (e.g., from 0 to 10), a string value (e.g., high risk or low risk), or the like.

In some implementations, analytics platform 235 may generate the driver risk score based on the driver variables. For example, analytics platform 235 may have access to information that identifies a set of risk categories. Here, each of the risk categories may correspond to a driver risk score. As a particular example, the set of risk categories may include ten categories (e.g., low risk to high risk), where each risk category may be associated with a driver risk score (e.g., from 10 to 1). Here, a higher value score indicates a lower level of risk, and vice-versa. In this example, each driver risk category may be associated with a set or a range of values for each of the driver variables. In some implementations, analytics platform 235 may identify the set or the range of values, associated with the each risk category, using an analytical technique, such as a k-clustering technique. Analytics platform 235 may compare the driver variables to the set or the range of values associated with each driver risk category, and may identify a driver risk category to which the driver belongs, and a corresponding driver risk score, based on the comparison.

As further shown in FIG. 7, process 700 may include providing information associated with the driver risk score (block 725). For example, analytics platform 235 may provide information associated with the driver risk score. In some implementations, analytics platform 235 may provide the information associated with the driver risk score after analytics platform 235 generates the driver risk score.

In some implementations, analytics platform 235 may provide the information associated with the driver risk score for storage. Additionally, or alternatively, analytics platform 235 may provide the information associated with the driver risk score for display to the driver (e.g., the user of user device 215) such that the driver may view the driver risk score.

In some implementations, analytics platform 235 may provide the information associated with the driver risk score to cause an action to be automatically performed. For example, analytics platform 235 may provide the information associated with the driver risk score to one or more insurer devices (e.g., associated with different insurers) to cause insurance quotes to be automatically generated and provided to the driver. In some implementations, the driver risk score can be used in a similar manner as the basic trip score and/or the adjusted trip score, as described above.

As another example, analytics platform 235 may provide the information associated with the driver risk score to cause an insurance rate, associated with the driver, to be automatically updated and/or adjusted based on the driver risk score. As another example, analytics platform 235 may provide the information associated with the driver risk score to cause a calendar notification, associated with contacting the driver, to be automatically generated (e.g., such that the insurer may contact the driver regarding the driver risk score).

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

In this way, analytics platform 235 may generate a driver risk score that more accurately assesses the driving risk associated with the driver of vehicle 205 relative to an assessment based on telematics data alone. Furthermore, processing by the analytics platform 235 may conserve computing resources of associated devices (e.g., a device associated with an entity interested in the driver risk score, such as an insurer), as the associated devices will not have to store, process, and/or send a vast amount of information used to generate the driver risk score. Further still, use of the analytics platform 235 may conserve network resources, as only the computed risk scores need to be provided to the associated devices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    determining, by a device, a set of trip attributes associated with a driving trip taken by a vehicle,
        the set of trip attributes being determined based on at least two of:
            location data associated with the driving trip,
            geospatial data determined based on the location data associated with the driving trip, or
            weather data associated with the driving trip;
    deriving, by the device, a set of driving style variables based on a manner in which the vehicle was driven during the driving trip,
        the set of driving style variables being determined based on at least two of:
            the location data,
            the geospatial data,
            the weather data,
            acceleration data associated with the driving trip, or
            a location-based variable derived from the location data;
        each driving style variable, of the set of driving style variables, indicating a driving behavior that a driver of the vehicle was capable of controlling during the driving trip; and
        the set of driving style variables including a speed score, an acceleration score, and a direction score,
            the speed score indicating a manner in which a speed of the vehicle varied during the driving trip,
            the acceleration score indicating a manner in which the vehicle accelerated and decelerated during the driving trip, and
            the direction score indicating a manner in which the vehicle handled turns during the driving trip;
    determining, by the device and based on the set of trip attributes, a trip score for the driving trip,
        the trip score indicating a measure of risk associated with the set of trip attributes, and
        the trip score being determined independently of any driving behavior that the driver of the vehicle was capable of controlling during the driving trip;
    generating, by the device, a trip risk score, associated with the driving trip, based on the speed score, the acceleration score, the direction score, and the trip score,
        the trip risk score including a metric that indicates a level of risk associated with the driving trip,
        the trip risk score being generated based on two or more of:
            a speed/trip score based on the speed score and the trip score,
            an acceleration/trip score based on the acceleration score and the trip score, and
            a direction/trip score based on the direction score and the trip score; and
    providing, by the device, information associated with the trip risk score.

2. The method of claim 1, further comprising:
    identifying a risk adjustment, to be applied to the trip risk score, based on a set of risk variables associated with the driving trip;
    adjusting the trip risk score, based on the risk adjustment, to create an adjusted trip risk score; and
    providing information associated with the adjusted trip risk score.

3. The method of claim 2, further comprising:
    deriving the set of risk variables, associated with the driving trip, that identifies high risk behavior associated with the manner in which the vehicle was driven during the driving trip,
        the set of risk variables being derived based on at least one of the location data, the geospatial data, the weather data, the acceleration data, or the location-based variable; and
    where identifying the risk adjustment comprises:
        identifying the risk adjustment based on the set of risk variables.

4. The method of claim 1, further comprising:
    applying a first weight factor to the speed/trip score to create a weighted first score;

applying a second weight factor to the acceleration/trip score to create weighted second score;
applying a third weight factor to the direction/trip score to create a weighted third score; and
where generating the trip risk score comprises:
generating the trip risk score based on a sum of the weighted first score, the weighted second score, and the weight third score.

5. The method of claim 1, where the information associated with the trip risk score is provided to a user device associated with the driver.

6. The method of claim 1, further comprising:
identifying a driver risk category, associated with the driver, based on the set of driving style variables; and
generating a driver risk score based on the identified driver risk category.

7. The method of claim 1, wherein determining the trip score further comprises:
determining the trip score based on historical driving trip data associated with multiple drivers.

8. A method, comprising:
determining, by a device, a set of trip risk scores, corresponding to a driver, for a set of driving trips that were taken by the driver,
a trip risk score, of the set of trip risk scores, including a first metric that indicates a level of risk associated with a corresponding driving trip of the set of driving trips, and
the trip risk score being based on at least two of:
particular location data associated with the corresponding driving trip,
particular geospatial data associated with the corresponding driving trip, or
particular weather data associated with the corresponding driving trip;
deriving, by the device and using the set of trip risk scores, a set of driver variables, associated with the driver, based on a manner in which a vehicle was driven by the driver during the set of driving trips,
the set of driver variables being derived based on at least two of:
driver data associated with the driver,
location data associated with the set of driving trips,
geospatial data determined based on the location data associated with the set of driving trips,
acceleration data associated with the set of driving trips, or
weather data associated with the set of driving trips;
each driver variable, of the set of driver variables, indicating driving behavior that the driver was capable of controlling during the driving the set of driving trips; and
the set of driver variables including a speed score, an acceleration score, and a direction score,
the speed score indicating a manner in which a speed of the vehicle varied during the set of driving trips,
the acceleration score indicating a manner in which the vehicle accelerated and decelerated during the set of driving trips, and
the direction score indicating a manner in which the vehicle handled turns during the set of driving trips;
generating, by the device, a driver risk score, associated with the driver, based on the speed score, the acceleration score, and the direction score,
the driver risk score including a second metric that indicates a level of risk associated with driving behavior that the driver was capable of controlling during the set of driving trips; and
providing, by the device, information associated with the driver risk score.

9. The method of claim 8, further comprising:
identifying a driver risk category, associated with the driver, based on the set of driver variables; and
where generating the driver risk score comprises:
generating the driver risk score based on the identified driver risk category.

10. The method of claim 8, where the driver data includes at least one of:
demographic information associated with the driver,
information associated with an insurance claim associated with the driver,
information associated with a moving violation or a ticket associated with the driver, or
a response of the driver to a behavioral question.

11. The method of claim 8, further comprising:
determining sets of trip attributes corresponding to the set of driving trips;
deriving sets of driving style variables corresponding to the set of driving trips;
generating the set of trip risk scores, associated with the set of driving trips, based on the sets of trip attributes and the sets of driving style variables; and
where determining the set of trip risk scores comprises:
determining the set of trip risk scores based on generating the set of trip risk scores.

12. The method of claim 8, further comprising:
determining a driver identifier associated with the driver; and
determining the driver data, the set of trip risk scores, the location data, the geospatial data, the acceleration data, or the weather data based on the driver identifier associated with the driver.

13. The method of claim 8, where the information associated with the driver risk score is provided to at least one of a user device associated with the vehicle, or the vehicle.

14. A non-transitory computer-readable medium storing instructions, the instructions comprising:
one or more instructions that, when executed by one or more processors, cause the one or more processors to:
determine trip attributes based on at least one of:
location data associated with a driving trip taken by a vehicle,
geospatial data associated with the driving trip, or
weather data associated with the driving trip;
derive driving style variables based on a manner in which the vehicle was driven during the driving trip,
the driving style variables being derived based on at least two of:
the location data,
the geospatial data,
the weather data,
acceleration data associated with the driving trip, or
location-based variables derived from the location data;
each driving style variable, of the driving style variables, indicating a driving behavior that a driver of the vehicle was capable of controlling during the driving trip; and
the driving style variables including a speed score, an acceleration score, and a direction score, the speed score indicating a manner in which a speed of the vehicle varied during the driving trip, the acceleration score indicating a manner in which the vehicle accelerated and decelerated during the driving trip, and the direction score indicating a manner in which the vehicle handled turns during the driving trip;

determine, based on the trip attributes, a trip score for the driving trip;

generate a trip risk score, associated with the driving trip, based on the trip attributes and the driving style variables, the trip risk score including a metric that indicates a level of risk associated with the driving trip, and where the one or more instructions, that cause the one or more processors to generate the trip risk score, cause the one or more processors to:

generate the trip risk score based on two or more of:

a speed/trip score based on the speed score and the trip score, an acceleration/trip score based on the acceleration score and the trip score, and a direction/trip score based on the direction score and the trip score; and provide information associated with the trip risk score.

15. The non-transitory computer-readable medium of claim 14, where the one or more instructions, when executed by the one or more processors, further cause the one or more processors to:

derive driver variables, associated with the driver, that include a set of variables associated with a manner in which the vehicle was driven by the driver during a set of driving trips, the set of driving trips including the driving trip, and the driver variables being derived based on a set of trip risk scores, corresponding to the set of driving trips, the set of trip risk scores including the trip risk score;

generate a driver risk score, associated with the driver, based on the driver variables, the driver risk score including a metric that indicates a level of risk associated with the driver; and provide information associated with the driver risk score.

16. The non-transitory computer-readable medium of claim 14, where the one or more instructions, when executed by the one or more processors, further cause the one or more processors to:

identify a risk adjustment, to be applied to the trip risk score, based on a set of risk variables associated with the driving trip;

adjust the trip risk score, based on the risk adjustment, to create an adjusted trip risk score; and provide information associated with the adjusted trip risk score.

17. The non-transitory computer-readable medium of claim 16, where the one or more instructions, when executed by the one or more processors, further cause the one or more processors to:

derive risk variables, associated with the driving trip, that identify risky behavior associated with the manner in which the vehicle was driven during the driving trip, the risk variables being derived based on the location data, the geospatial data, the weather data, the acceleration data, or the location-based variables; and where the one or more instructions, that cause the one or more processors to identify the risk adjustment, cause the one or more processors to:

identify the risk adjustment based on the risk variables.

18. The non-transitory computer-readable medium of claim 14, where the information associated with the trip risk score is provided to an insurer device associated with an insurer of the vehicle.

19. The non-transitory computer-readable medium of claim 14, where the one or more instructions, when executed by the one or more processors, further cause the one or more processors to:

identify a driver risk category, associated with the driver, based on the driving style variables; and generate a driver risk score based on the identified driver risk category.

20. The non-transitory computer-readable medium of claim 14, where the one or more instructions, that cause the one or more processors to determine the trip score, further cause the one or more processors to:

determine the trip score based on historical driving trip data associated with multiple drivers.

* * * * *